United States Patent
Memon

(10) Patent No.: US 6,444,731 B1
(45) Date of Patent: Sep. 3, 2002

(54) MODIFIED ASPHALT

(76) Inventor: G. Mohammed Memon, 46252 Hollymead Pl., Sterling, VA (US) 21065

( * ) Notice: Subject to any disclaimer, the term of this patent is extended or adjusted under 35 U.S.C. 154(b) by 0 days.

(21) Appl. No.: 09/578,825

(22) Filed: May 24, 2000

Related U.S. Application Data

(63) Continuation-in-part of application No. 09/369,186, filed on Aug. 6, 1999, now abandoned.

(51) Int. Cl.[7] .................................................. C09D 195/00
(52) U.S. Cl. ............................ 524/59; 524/68; 524/71; 106/246; 106/247; 106/274; 106/275; 106/281.1
(58) Field of Search ................................ 106/247, 246, 106/274, 275, 281.1; 524/59, 71, 68

(56) References Cited

U.S. PATENT DOCUMENTS

| | | | | |
|---|---|---|---|---|
| 5,385,401 A | * | 1/1995 | Nath ............................ 366/7 |
| 5,436,285 A | * | 7/1995 | Causyn et al. ................. 524/68 |
| 5,558,704 A | * | 9/1996 | Masuda et al. .......... 106/281.1 |
| 5,704,971 A | * | 1/1998 | Memon .................... 106/281.1 |
| 5,801,204 A | * | 9/1998 | Johansson et al. ............. 521/41 |

* cited by examiner

Primary Examiner—David Brunsman
(74) Attorney, Agent, or Firm—Lawrence E. Laubscher, Jr.

(57) ABSTRACT

A method for manufacturing modified asphalt is characterized by adding a dispersion agent such as furfural or vegetable oil to a modifier material and then mixing the modifier material with asphalt. The dispersion agent facilitates dispersion of the modifier through the asphalt to form a homogeneous mixture. A first activator is added to the mixture to produce a devulcanized and stabilized asphalt material having improved rheological, separation and solubility characteristics. A micro activator is also added to the mixture to improve the ductility of the modified asphalt. The modifier material comprises granular crumb rubber or polymer.

8 Claims, 1 Drawing Sheet

MODIFIED ASPHALT

This application is a continuation-in-part of U.S. patent application Ser. No. 09/369,186 filed Aug. 6, 1999.

BACKGROUND OF INVENTION

The rheological properties of asphalt have led to its widespread use as the binder in asphalt cement concrete (ACC). Even though asphalt cement concrete has a long history as a useful binder, it has severe performance deficiencies including rutting in hot climates and cracking in cold climates. Modified asphalt binders, especially those containing polymer or crumb rubber, improve high and low temperature Theological properties of asphalt cement concrete. The present invention relates to a method for improving both the high and low temperature performance of asphalt cement binders and mixes containing true binders. The improvements affected were accomplished by developing a unique dispersion system and stabilization technique involving the combination of dispersion and activating agents as well as systematic and well-controlled mixing of the agents and asphalt.

BRIEF DESCRIPTION OF THE PRIOR ART

Homogeneous crumb rubber modified asphalts are known in the art, as evidenced by the Memon patent U.S Pat. No. 5,704,971. As disclosed therein, peroxide is mixed with crumb rubber to modify it so that it mixes more evenly with the asphalt. While the peroxide-modified crumb rubber operates satisfactorily, there is still room for improvement of the modified crumb rubber so that it disperses more evenly through the asphalt.

Since crumb rubber is generated by cutting and slicing used tires, any developments which enhance the use of crumb rubber as a supplement to an asphalt composition will significantly improve the environment by reducing stockpiles of tires. The asphalt/crumb rubber composition also has an improved performance in all types of climates. The present invention was developed to improve the crumb rubber modified asphalt with a new treatment process to enhance dispersion of crumb rubber throughout an asphalt composition.

SUMMARY OF THE INVENTION

Accordingly, it is a primary object of the present invention to provide a method for making a modified asphalt wherein a dispersion agent such as furfural or vegetable oil is added to a modifier material such as granular crumb rubber or a polymer to form a treated modifier material. This material is mixed at an elevated temperature of between 90° C. and 1500° C. to ensure that the modifier material is fully treated with the dispersion agent. Next, the treated modifier material is added to hot asphalt, and the combination is mixed. After mixing, a first activator is added to the modified asphalt to produce a devulcanized and stabilized asphalt mixture having improved rheological, separation, and solubility characteristics. A trace amount of micro activator is also added to the modified asphalt to increase the ductility or stretching property of the modified asphalt.

According to a more specific object of the invention, the first activator material comprises an acid such as a Lewis acid and contains a trace of sulfur. The micro activator is phenyl formaldehyde resin.

BRIEF DESCRIPTION OF THE DRAWING

Other objects and advantages of the invention will become apparent from a study of the following specification when viewed in the light of the accompanying drawing, in which.

DETAILED DESCRIPTION

Figure 1:
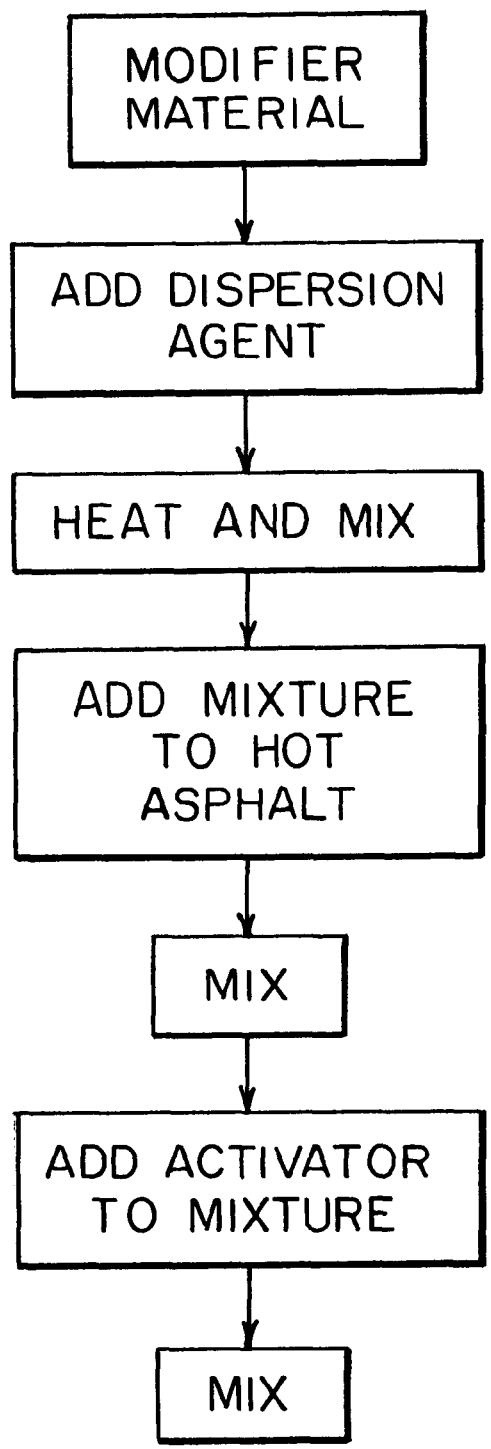
FIG. 1 is a flow diagram showing the method steps for making modified asphalt according to a preferred embodiment of the invention.

The preferred materials used to modify asphalt according to the invention are granular crumb rubber or polymers. Crumb rubber is obtained from used tires which are cut and/or sliced into smaller pieces. These pieces may be pulverized in a known manner to form granular crumb rubber particles. Suitable polymers for the modifier material are styrene butadiene (SB) block co-polymer from Housmex, styrene butadréne styrene (SBS) co-polymer from Fineprene, Respol, or Korean Companies, and styrene butadiene rubber (SBR) from Ultrapare.

The modifier material is treated with a dispersion agent. Preferably, the dispersion agent is furfural ($C_5H_4O_2$) which can be obtained from Great Lake Chemicals or common vegetable oil, or both. The dispersion agent is sprayed onto the modifier material. The modifier material is heated to between 90° C. and 1500° C. and mixed for about 10 minutes to evenly distribute the dispersion agent throughout the modifier.

Next, the treated modifier is added to hot asphalt which is available from Blacklidge Emulsions and Koch Materials Company. The entire combination is thoroughly mixed for a period of between 1 and 1.5 hours depending on the asphalt source and the type of polymer if a polymer is used as the modifier material.

A first activator material is then added to the treated modifier and asphalt and mixing continues for another 45 minutes to 1 hour. The first activator is preferably a Lewis acid with a trace amount of sulfur such as P-toluene sulfonic acid from Aldrich Chemicals.

A trace amount of micro activator which has an active aldehyde group is also added to significantly increase the ductility or stretching properties of the modified binder. This overcomes the problems of working with non-compatible asphalt by providing a material without any lump formation in the modified asphalt.

The dispersing and activating agents together produce a devulcanized, stabilized asphaltic system characterized by improved homogeneity/separation, solubility, viscosity, and high and low temperature Theological properties. The activators improve the activation rate of the modifier to improve the bonding reaction between the modifier material and the asphalt. The combination of activators also reduces the interaction time to between 1 and 1.5 hours.

The concentration of the dispersing agent is preferably between 0.0003–0.08 milimoles/gram of asphalt binder. The concentration is adjusted in accordance with the concentration of functional groups and polar compounds of asphalt binder. The concentration of the activator acid is preferably 0.0003–0.0005 milimoles/gram of asphalt and the concentration of the trace amount of sulfur is preferably 0.0001–0.0003 milimoles/gram of asphalt. The preferred micro activator is phenyl formaldehyde resin.

Although the preferred method of making modified asphalt has been described, the sequence of steps may be altered with satisfactory results. However, the sequence of steps set forth above results in improved homogeneity of the modifier within the asphalt. This minimizes settling of the asphalt and raveling after seasonal changes in the climate. Dispersion followed by activation minimizes the preparation time of the finished product because the modifier rapidly and evenly disperses through the asphalt owing to the hydraulic pressure of the furfural and vegetable oils. The finished asphalt is also smoother and sturdier than conventional crumb rubber asphalt mixtures.

Testing has been conducted on various materials and dispersing agents. Set forth in Table I below are different modifiers and the dispersion times therefor with and without a dispersion agent according to the invention.

TABLE I

DISPERSION TIMES WITH DIFFERENT MODIFIERS

| Modifiers | Without Dispersion Agent (hrs) | With Dispersion Agent (hrs) |
|---|---|---|
| Fineprene 401 (SBS) | 4 | 1.1 |
| Housmex 1205 (SB) | 4.5 | 1.3 |
| Repsol 411 (SBS) | 4 | 1.2 |
| Korean 5100X (SBS) | 3 | 1.1 |
| Crumb Rubber | 4 | 1.5 |

In Table II are set forth the rheological properties of asphalts with different modifiers.

TABLE II

RHEOLOGICAL PROPERTIES WITH DIFFERENT MODIFIERS

| Sample | Asphalt | High PG | Low PG | Separation % | Solubility % | Viscosity |
|---|---|---|---|---|---|---|
| 1 | Neat | 64 | -22 | 2% | 99.5% | 425 |
|   | PMA | 76 | -28 | 3.5% | 99.5% | 1250 |
| 2 | Neat | 64 | -22 | 2% | 99.5% | 450 |
|   | PMA | 76 | -34 | 3.3% | 99.5% | 1205 |
| 3 | Neat | 64 | -22 | 2.5% | 99.5% | 430 |
|   | PMA | 76 | -28 | 3.5% | 99.5% | 1240 |
| 4 | Neat | 64 | -22 | 3% | 99.5% | 440 |
|   | PMA | 76 | -22* | 4% | 99.5% | 1250 |
| 5 | Neat | 64 | -22 | 3% | 99.5% | 430 |
|   | Control CRMA | 70 | -22 | 30% | 89.5% | 1125 |
|   | CRMA | 76 | -22* | 3.5% | 98.2% | 1750 |
| 6 | Neat | 64 | -22 | 3% | 99.5% | 440 |
|   | Control CRMA | 70 | -22 | 25% | 88% | 1250 |
|   | CRMA | 76 | -28 | 3.2% | 97.55% | 1650 |

PMA - polymer modified asphalt
CRMA - crumb rubber modified asphalt
PG - performance grade
*Some of the low temperature PG could have been improved further if additional ingredients were added.

The performance grade, separation, solubility, and viscosity were determined by the various Strategic Highway Research Program (SHRP) test methods using the Dynamic Shear Rheometer (DSR) and Bending Beam Rheometer at various temperatures.

The micro activator was tested on two different asphalts from Hudson Refinery and Blacklidge Emulsions. This micro activator was mixed for a period of 1 to 1.5 hours in combination with the first activator, depending on the crude source and the type of crumb rubber or polymer used as a modifier material. The micro activator used in this invention was phenyl formaldehyde resin and the test results are shown in Table III

TABLE III

| Asphalts | Phase Angle (δ) without MA (in degrees) | Phase Angle (δ) with MA (in degrees) | Compatibility without MA | Compatibility with MA |
|---|---|---|---|---|
| Blacklidge Emulsion | 80.3 | 74.1 | Lump Formation | No Lump Formation |
| Hudson Refinery | 81.24 | 76.6 | Lump Formation | No Lump Formation |

The addition of the micro activator results in a modified binder which has improved phase angle (related to the stretching mode of the modified binder) and also makes the modified system work with the non-compatible asphalt without forming any lumps in the modified asphaltic system.

While in accordance with the provisions of the Patent Statute the preferred forms and modifications of the invention have been illustrated and described, it will be apparent to those of ordinary skill in the art that various changes and modifications may be made without deviating from the inventive concepts set forth above.

What is claimed is:

1. A method for making a modified asphalt, comprising the steps of:

(a) adding a dispersion agent comprising at least one of furfural and vegetable oil to modifier material comprising at least one of a granular crumb rubber and polymer having an unsaturation to form a treated modifier material;

(b) mixing the treated modifier material at a temperature of between 90° C. and 1500° C.;

(c) adding the treated modifier material to hot asphalt;

(d) mixing the combination of treated modifier material and hot asphalt; and, (e) adding a first acidic activator material to the mixture of treated modifier material and hot asphalt to produce a devulcanized and stabilized asphalt material having improved theological, separation and solubility characteristics.

2. A method as defined in claim 1, wherein said first activator material comprises an acid containing a trace amount of sulfur.

3. A method as defined in claim 2, wherein said treated modified material is mixed for from 5 to 15 minutes prior to adding to said hot asphalt.

4. A method as defined in claim 2, wherein said treated modifier material is mixed with hot asphalt for between 1.0 and 1.5 hours.

5. A method as defined in claim 2, wherein said first activator material, treated modifier material and asphalt are mixed from between 0.75 and 1 hour.

6. A method as defined in claim 1, and further comprising the step of adding a micro activator comprising phenyl formaldehyde resin to the mixture of treated modifier material and hot asphalt to improve the ductility of the modified asphalt.

7. A modified asphalt material, comprising:

(a) hot asphalt;

(b) a granular modifier material comprising at least one of crumb rubber and polymer having an unsaturation treated with at least one of a furfural and vegetable oil dispersion agent to facilitate dispersion of the modifier material within the asphalt; and (c) an activator material for activating the hot asphalt and modifier mixture to produce a product with improved rheological, separation, and solubility characteristics.

8. A crumb rubber modified asphalt material as defined in claim 7, wherein said activator material comprises a first acidic activator and a micro activator comprising phenyl formaldehyde resin.

* * * * *

UNITED STATES PATENT AND TRADEMARK OFFICE
CERTIFICATE OF CORRECTION

PATENT NO.     : 6,444,731 B1
DATED          : September 3, 2002
INVENTOR(S)    : G. Mohammed Memon It is certified that error appears in the above-identified patent and that said Letters Patent is hereby corrected as shown below:

<u>Column 4,</u>
Line 31, change "theological" to -- rheological --,

Signed and Sealed this

Twenty-fifth Day of February, 2003

JAMES E. ROGAN
*Director of the United States Patent and Trademark Office*